United States Patent Office 3,562,230
Patented Feb. 9, 1971

3,562,230
BROMINATION OF COPOLYMERS OF NON-TERMINAL ACETYLENIC METHACRYLATES AND PRODUCTS PRODUCED THEREBY
Gaetano F. D'Alelio, South Bend, Ind., assignor to Geigy Chemical Corporation, Ardsley, N.Y., a corporation of New York
No Drawing. Filed June 28, 1968, Ser. No. 740,863
Int. Cl. C08f *15/18*
U.S. Cl. 260—85.5                          9 Claims

ABSTRACT OF THE DISCLOSURE

The process disclosed herein involves the bromination of copolymers of non-terminal acetylenic methacrylates and the brominated products produced thereby. Acetylenic methacrylate polymers upon dibromination of the acetylene group give ethylenic dibromo derivatives which are hydrolytically stable. In comparison the derivative obtained upon dibromination of a polymer of allyl methacrylate has dibromopropyl methacrylate repeating units which are susceptible to hydrolysis of the bromine. Thus where it is desired to impart flame resistant properties to a polymer it is possible to impart both flame resistance and hydrolytic stability by dibromination of corresponding copolymers containing repeating units of the formula

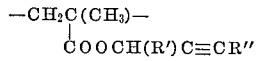

wherein R' is H or R", and R" is a hydrocarbon radical of 1–8 carbons. Where higher proportions of bromine are desired and hydrolytic stability is of less importance, tetrabromination can be effected.

BACKGROUND OF THE INVENTION

Field of the invention

This invention relates to the bromination of copolymers of non-terminal acetylenic methacrylates. More specifically, it relates to the process of brominating methacrylate repeating units having non-terminal acetylenic groups and the products produced thereby. Still more specifically, it relates to bromination capable of producing dibromo derivatives which still have ethylenic unsaturation effective for stabilizing the derivatives against hydrolysis.

Related prior art

Bromination of homopolymers of non-terminal acetylenic acrylates are disclosed in a doctorate thesis submitted in 1965 by Robert C. Evers to the graduate school of the University of Notre Dame. However, such homopolymers are relatively expensive and it is desirable to impart flame resistance to polymers having other desirable characteristics and also of less expensive materials. Therefore polymers of lower cost and of the desired other properties would be desirable for bromination, particularly if brominated products of hydrolytic stability can be produced.

STATEMENT OF THE INVENTION

In accordance with the invention, it has now been found that bromination can be effected on copolymers of non-terminal acetylenic methacrylates having repeating units of the formula

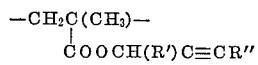

wherein R' is H or R", and R" is a hydrocarbon radical of 1–8 carbon atoms. Either ethylenic dibromo derivatives or tetrabromo derivatives can be produced and the proportion of such acetylenic repeating units in the copolymer can be limited to the amount desired for the flame resistance properties.

For the bromination purposes of this invention, copolymers of acetylenic methacrylates are preferred rather than the corresponding acrylates since methacrylate polymers are more stable than acrylates in anionic polymerization systems. In order to avoid or minimize the amount of cross-linking effected during polymerization of acetylenic acrylates and methacrylates, polymerization is effected by anionic initiators, such as sodium naphthalene. Moreover, in this particular invention non-terminal acetylenic groups are preferred over terminal acetylenic groups since they are more resistant against or less susceptible to oxidation. Furthermore the terminal acetylenic groups are more acidic and more likely to pick up bases which are inclined to cause dehalogenation of the repeating units.

Typical non-terminal acetylenic methacrylates for preparation of copolymers suitable for the practice of this invention include the following methacrylates:

2-butyn-1-yl;
1-methyl-2-butyn-1-yl;
1-phenyl-2-butyn-1-yl;
1-cyclohexyl-2-hexyl-1-yl;
1-tolyl-2-pentyn-1-yl;
4-phenyl-2-butyn-1-yl;
4-cycloheptyl-2-butyn-1-yl;
4-benzyl-2-butyn-1-yl;
1-amyl-2-butyn-1-yl;
1-octyl-2-butyn-1-yl; etc.

The bromination of the non-terminal acetylenic methacrylate repeating units can be represented as follows:

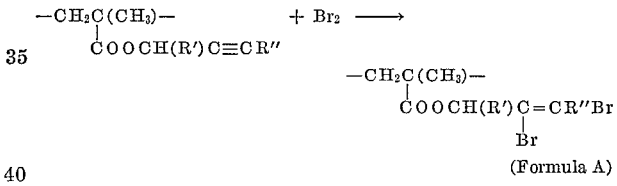

(Formula A)

When the copolymer has substantially all the acetylenic groups dibrominated, further bromination can be effected under appropriate conditions of bromine concentration, temperature, etc. as follows:

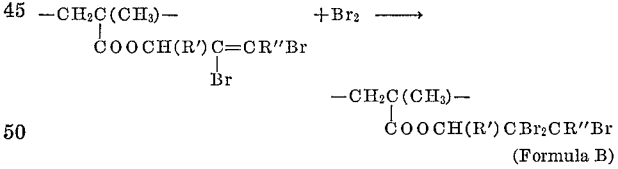

(Formula B)

The copolymers also have repeating units of comonomers as described hereinafter.

The brominated copolymers of this invention are particularly useful as fire retardant materials. Because of the hydrolytic stability of the ethylenic dibromide, the dibrominated materials can be stored or used for substantial periods without loss of fire retarding power which might otherwise be of concern upon exposure to moisture. By varying the proportions of non-terminal acetylenic methacrylates and respective other comonomers, the other properties in the ultimate copolymer can be governed according to the type and proportion of comonomer. The appropriate proportion of acetylenic methacrylate can be incorporated to impart the desired amount of fire retardant properties by complete or substantially complete dibromination of all such repeating units in the copolymer.

Depending on the particular comonomers, the copolymers of this invention can be used for similar purposes as other polymers of the particular comonomer, such as plastic moldings, castings, films, fibers, coatings, etc., with improved flame resistance. Moreover such copolymers can be admixed with various resins used for such purposes to improve their flame resistance.

In attempting to polymerize the non-terminal acetylenic methacrylate, the use of free radical-generating activators, such as peroxy compounds, azo compounds, etc. generally results in a substantial degree of polymerization in the acetylenic unsaturation as well as in the ethylenic unsaturation with resultant crosslinking and a high degree of gellation. While a small amount of gellation is permissible, in which case the gel can be separated and the remaining ungelled polymer can be used, it is undesirable to have a high proportion of gelled polymer since it is difficult to postreact a polymer in this form. Therefore, the copolymers of acetylenic methacrylate for use in this invention are advantageously prepared by anionic activators which help to make more selective polymerization in the ethylenic unsaturation. Also as pointed out above, the presence of the methyl group in the methacrylate radical stabilizes the acrylic radical against deterioration or reaction with the anionic activator.

Methods disclosed in the literature for conducting anionic polymerizations are suitable for preparing the copolymers used in this invention. Suitable anionic polymerization systems are described in D'Alelio U.S. Pats. Nos. 3,203,915 and 3,309,423. Typical anionic activators are also disclosed therein. Block and random copolymers may be employed in this invention.

For example the anionic polymerization can be initiated by alkali metal hydrides such as NaH, LiH, KH, CsH, including various complexes thereof, such as LiAlH$_4$, etc., alkali metal hydrocarbons, such as the metal alkyls of Li, Na, K and Cs with the hydrocarbon group being methyl, ethyl, propyl, isopropyl, butyl, amyl, isoamyl, benzyl, triphenylmethyl, phenyl, naphthyl, octyl, etc., preferably containing no more than 12 carbon atoms in a hydrocarbon group.

Also suitable are Grignard reagents having the formula R''MgX, where R'' is a hydrocarbon group as listed above and X is halogen. Typical examples of these are phenyl magnesium bromide, butyl magnesium bromide and chloride, vinyl magnesium bromide, allyl magnesium bromide, etc.

The free alkali metals such as lithium, sodium and potassium can also be used as activators, including combinations of alkali metals and aromatic compounds such as naphthalene, anthracene, methylstyrene tetramer, styrene, etc. and liquid ammonia solutions of the alkali metals. Also useful are ketyls which are the reaction products of alkali or alkaline earth metals with ketones, such as benzophenone in ether, for example the sodium reaction product of benzophenone, etc.

Solvents or diluents may be used, if desired, and these can be selected from the class of aliphatic and aromatic hydrocarbons, ketones, ethers, and esters, such as butane, propane, hexane, cycloheptane, octane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyl diethylene glycol ether, etc.

The anionic polymerization can be carried out at temperatures ranging from −80° C. to about 80° C. Although the range of −40° C. to 60° C. is advantageous, it is generally more practical to operate in the range of −20° C. to 40° C.

The anionic polymerizations produce linear polymers having a plurality of repeating units of the formula

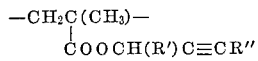

When comonomers are used with the non-terminal acetylenic methacrylate monomer, repeating units derived from such comonomers are also present in the linear copolymers. There are at least one and preferably at least two non-terminal methacrylate repeating units per copolymer molecule.

The copolymers used in this invention advantageously have a molecular weight of at least 500 and preferably at least 5000. There is no upper limit since this is generally determined by practical considerations. However, there is generally no particular advantage in exceeding molecular weights of about 800,000. The copolymers advantageously contain at least one percent by weight of non-terminal acetylenic methacrylate in the polymer molecules.

Preferred comonomers for preparing the acetylenic methacrylate copolymers used in this invention are the vinyl and vinylidene comonomers represented by the formula

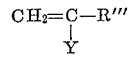

and the repeating units derived from such comonomers are represented by the formula

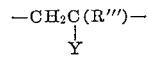

In these formulas, R''' represents hydrogen or the methyl or cyano radical, preferably hydrogen or methyl; Y represents:

(a) hydrocarbon, including alkyl, aryl, alkaryl, aralkyl, cycloalkyl, alkylcycloalkyl, cycloalkyl-alkyl;
(b) cyano; and
(c) —COOR'', wherein R'' is defined as herein.

The hydrocarbon groups of R' and R'' preferably have 1–8 carbon atoms. Typical repeating units for such comonomers are those of methyl acrylate, styrene and acrylonitrile which are

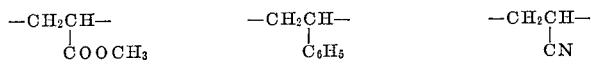

Typical examples of the comonomers of the above formulas that can be used in preparing the copolymers of this invention include the following: styrene, α-methylstyrene, vinyl toluene, vinyl xylene, isopropenyl toluene, vinyl naphthalene, isopropenyl naphthalene, vinyl diphenyl, isopropenyldiphenyl, ethylene, propylene, butene-1, 2-methyl-butene-1, hexene-1, 2-methyl-hexene-1, decene-1, 3-phenyl-propene-1, 4-phenylbutene-1, 2-methyl-3-phenyl-butene-1, vinyl cyclohexane, vinyl cycloheptane, vinyl methylcyclohexane, vinyl methylcycloheptane, 3-cyclohexyl-butene-1, 2-methyl-3-cycloheptyl-butene-1, 4-cyclopentyl-pentene-1, acrylonitrile, methacrylonitrile, vinylidene cyanide, methyl α-cyanoacrylate, methyl methacrylate, methyl acrylate, ethyl acrylate, propyl methacrylate, phenyl acrylate, phenyl methacrylate, benzyl acrylate, naphthyl acrylate, cyclohexyl acrylate, cyclohexyl methacrylate, vinyl acetate, isopropenyl acetate, vinyl propionate, isopropenyl-butyrate, vinyl hexanoate, vinyl decanoate, vinyl benzoate, isopropenyl benzoate, vinyl α-phenylacetate, vinyl α-tolylacetate, vinyl α-naphthylacetate, etc.

In conducting the bromination of the non-terminal acetylenic methacrylate copolymers according to this invention the proportion of bromine used is at least 5 parts per 100 parts of copolymer. The selected amount of bromine is dependent somewhat on whether all of the acetylenic groups present are to be dibrominated or to be tetrabrominated. However, the minimum amount of bromine is based on the minimum amount of bromine that needs to be added to the polymer in order to effect a desired change in properties with respect to fire retardance or other desired properties. If the bromination is to be taken to a complete state of dibromination, that is where all of the acetylenic groups are to be dibrominated, then a slight excess of the stoichiometric amount for this purpose is used. When more than this slight excess of the stoichiometric amount but less than the amount required for tetrabromination is used, the bromination can result in some dibromo ethylenic groups and some tetrabrominated groups. When more than the required amount is added for tetrabromination, the completeness of tetrabromination depends somewhat on the temperature and time of reaction. Where the time is sufficient for the particular temperature being used and there is sufficient bromine for this purpose, tetrabromination can be substantially completed.

The temperature for both dibromination and tetrabromination can be in the range of 0 to 50° C. preferably 20 to 25° C. The time to effect the minimum desired amount of bromination will vary according to the temperature. For example, at a temperature of 50° C. the bromination to the minimum amount will require much less time than to effect the minimum amount of bromination at 0° C. Therefore the minimum time will vary according to the particular temperature being used, although the time is advantageously at least 60 minutes in any case, and preferably at least 180 minutes depending on the temperature and the extent of bromination desired.

The bromination is advantageously effected on a solution of the copolymer since the starting copolymers are solid or very viscous, and become even more so upon bromination. Obviously the solvent should be inert to the bromination. Typical suitable solvents are chlorinated aliphatic and aromatic hydrocarbons, carbon tetrachloride, ethylene dichloride, trichloroethane, chloroform, chlorobenzene, etc., as well as the various hydocarbon solvents inert in bromine under the conditions of these reactions, such as hexane, heptane, octane, benzene, toluene, xylene, etc. The inertness of the solvent is not critical in the sense that it will interfere with the reaction, but it is more desirable in order to avoid waste of the bromine reagent, and also to avoid formation of any bromine derivatives that might precipitate or become viscous and thereby precipitate the polymer.

Typical hydrocarbon monovalent radicals as represented by R′, R″ and R′″, include: methyl, ethyl, propyl, butyl, amyl, hexyl, heptyl, octyl, decyl, phenyl, tolyl, xylyl, naphthyl, methylnaphthyl, ethylnaphthyl diphenyl, methyldiphenyl, benzyl, phenethyl, phenylpropyl, cyclohexyl, cyclohexylmethyl, cycloheptyl, methylcycloheptyl. While the hydrocarbon groups listed above do not contain ethylenic unsaturation, groups containing unsaturation can be used provided that the unsaturation does not cause premature crosslinking of the linear copolymers. However, there is no particular advantage in their use. Generally, it is preferable to use alkyl, aryl, aralkyl, alkaryl, cycloalkyl, alkylcycloalkyl and cycoalkyl-alkyl groups.

The practice of this invention is best illustrated by the following examples. These examples are given merely by way of illustration and are not intended to limit the scope of the invention in any way nor the manner in which the invention can be practiced. Unless specifically indicated otherwise, parts and percentages are given as parts and percentages by weight.

EXAMPLE I

Preparation of 2-butynyl methacrylate monomer

Into a round-bottom, 3-necked flask fitted with a Dean-Stark trap, a nitrogen inlet, a reflux condenser and a thermometer are placed 68 parts of 2-butyn-1-ol, 86 parts of glacial methacrylic acid, 4 parts of p-toluene sulfonic acid, 0.2 part of p-tert-butyl catechol (as inhibitor) and 120 parts of dry benzene. The reaction mass is placed under a slight nitrogen pressure and refluxed until 18 parts of water is azeotroped over into the Dean-Stark trap. The reaction mass is then neutralized with a saturated sodium carbonate aqueous solution and dried over anyhydrous sodium carbonate. The sodium carbonate is then filtered off and the benzene stripped off under reduced pressure. Distillation of the residue gives a 60% yield of 2-butyn-1-yl methacrylate having a boiling point of 110° C. at 66 mm. of Hg.

EXAMPLE II

Anionic polymerization

A 5-necked glass flask is used as the reaction vessel. This is connected with an evacuation means for producing a high-vacuum and fitted with an externally driven magnetic stirrer, one of the side arms of the flask being attached to a 50-ml. round bottomed flask and also fitted with a stop-cock, crowned with a serum cap, and a helium inlet tube. A solution of about 50% monomer mixture of 2-butyn-1-yl methacrylate or other non-terminal acetylenic methacrylate in tetrahydrofurane is stored over calcium hydride in the round-bottom flask for at least 8 hours and then degassed twice at $3 \times 10^{-6}$ mm. Hg. The reaction vessel is flamed in a stream of helium and then the monomer and solvent are distilled into the reaction vessel. The system is then pressured with helium to slightly above atmospheric pressure and the reaction vessel then cooled to the desired temperature. In most cases, unless otherwise specified, this temperature is −40° C. Then initiator solution, in most cases sodium naphthalene solution, is injected volumetrically by means of a hypodermic syringe through the serum cap. The initiator to monomer mole ratio is 1:40. The polymerization is allowed to proceed with continued agitation until a noticeable increase in viscosity is observed. The polymerization is terminated by injection of 3 parts of methanol into the solution mixture. The resultant copolymer is isolated by precipitation in a non-solvent, redissolved and reprecipitated 3 times in a suitable solvent-nonsolvent system. The copolymer solutions are filtered through sintered discs before reprecipitation. Generally benzene is used as the solvent and heptane as the precipitant. About 0.2% 2,6-di-tert-butyl-p-cresol is used as inhibitor in both solvent and precipitant. The isolated copolymer is dried to constant weight in a vacuum at about 25° C. The filtrate is evaporated under reduced pressure to isolate hexane-soluble copolymer.

EXAMPLE III

Post-bromination of polymers

Into a glass-stoppered flask there is placed a solution of 0.6 part of a copolymer of 75 percent styrene and 25 percent of 2-butyn-1-yl methacrylate or other non-terminal acetylenic methacrylate prepared according to Example II and dissolved in 3 parts of carbon tetrachloride. To this is added a slight excess over the theoretical amount of bromine calculated for the desired amount of addition to the acetylenic groups in the polymer. The resulting mixture is well agitated to assure thorough mixing and then the flask is stoppered and placed in a bath maintained at 30° C. for 3 hours. At the end of this time, 15 parts of heptane is added and the precipitated polymer is isolated by filtration and then redissolved and reprecipitated twice, carbon tetrachloride being used as the solvent and heptane as the precipitant. The resulting copolymer has repeating units represented by Formulas A′ and B′ shown below. When the amount of bromine is not greatly in excess of 1 mole per acetylenic group therein, there are mostly repeating units of Formula A′; when a considerable excess over 1 mole of bromine is used per acetylenic group there are also repeating units of Formula B′; and when 2 moles or more of bromine are used, there are more repeating units of Formula B′ than of Formula A′.

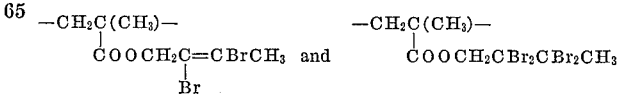

EXAMPLE IV

The dibrominated product from Example III is further brominated by continuing the bromination at the same temperature after additional bromine has been added in 10% excess over that calculated to effect bromination of the dibromo derivative to the tetrabromo derivative. Tetrabromination is found to be substantially completed at the end of 36 hours.

EXAMPLE V

Dibromination is effected on a number of copolymers of 2-butyn-1-yl methacrylate (BMA) having the respective proportions in the copolymer structures as indicated below:

(a) 80 styrene—20 BMA
(b) 50 vinyl toluene—50 BMA
(c) 80 methyl methacrylate—20 BMA
(d) 50 acrylonitrile—50 BMA
(e) 75 methyl acrylate—25 BMA
(f) 60 α-methylvinyl toluene—40 BMA
(g) 80 ethyl acrylate—20 BMA In each case an amount of bromine is used calculated as theoretical plus 10% excess required to dibrominate the number of acetylenic groups present in the copolymer. In each case the dibromination is substantially completed at the end of the reaction period used as in Example III. In addition to the repeating units of Formula A', as given above, the dibrominated copolymers have the respective repeating units as in the starting copolymer. These are namely:

(a) $-CH_2CH-$
　　　$|$
　　　$C_6H_5$ (b) $-CH_2CH-$
　　　$|$
　　　$C_6H_4CH_3$ (c) $-CH_2C(CH_3)-$
　　　$|$
　　　$COOCH_3$ (d) $-CH_2CH(CN)-$ (e) $-CH_2CH-$
　　　$|$
　　　$COOCH_3$ (f) $-CH_2C(CH_3)-$
　　　$|$
　　　$C_6H_4CH_3$ (g) $-CH_2CH-$
　　　$|$
　　　$COOC_2H_5$

Each of these dibrominated copolymers is found to have excellent fire retardant properties and good shelf life because of the hydrolytic stability effected by the ethylenic group as explained above.

When these dibrominated copolymers are further brominated as in Example IV the tetrabromo derivatives are obtained.

EXAMPLE VI

Similar results are obtained when an equivalent weight of each of the following acetylenic methacrylates is used in place of the 2-butyn-1-yl in the procedures of Examples III, IV and V:

1-methyl-2-butyn-1-yl;
1-phenyl-2-butyn-1-yl;
1-cyclohexyl-2-hexyl-1-yl;
1-tolyl-2-pentyn-1-yl;
4-phenyl-2-butyn-1-yl;
4-cycloheptyl-2-butyn-1-yl;
4-benzyl-2-butyn-1-yl;
1-amyl-2-butyn-1-yl; and
1-octyl-2-butyn-1yl.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A brominated copolymer of a non-terminal acetylenic methacrylate having a molecular weight of at least 5000 and having the repeating unit formula $$-CH_2-C(CH_3)-$$
　　　　　$|$
　　　　$COOCH(R')C\equiv CR''$ wherein R' is hydrogen or R'', and R'' is a hydrocarbon radical of 1–8 carbons, and after bromination having plurality of brominated repeating units therein selected from the class consisting of:

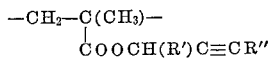

and

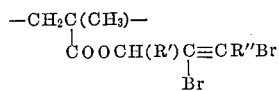

said copolymer also having repeating units therein of the formula $$-CH_2C(R''')-$$
　　　$|$
　　　$Y$ wherein R''' represents hydrogen or a methyl or cyano radical: Y represents a radical selected from the class of hydrocarbon of no more than 12 carbon atoms, cyano and $-COOR''$; R' is hydrogen or R''; and R'' is a hydrocarbon radical of 1–8 carbon atoms, and there are at least two of said brominated repeating units per polymer molecule.

2. A brominated polymer of claim 1 in which said brominated repeating units are predominantly:

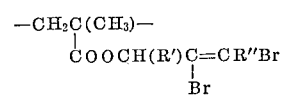

3. A brominated copolymer of claim 1 in which said brominated repeating units are predominantly:

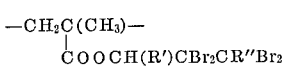

4. A brominated copolymer of claim 1 in which copolymer said Y-containing formula represents repeating units of the structure

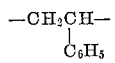

5. A brominated copolymer of claim 1 in which copolymer said Y-containing formula represents repeating units of the structure

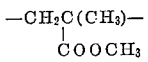

6. A brominated copolymer of claim 1 in which copolymer said Y-containing formula represents repeating units of the structure $$-CH_2CH(CN)-$$

7. A brominated copolymer of claim 1 in which copolymer said Y-containing formula represents repeating units of the structure

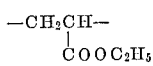

8. A brominated copolymer of claim 1 in which copolymer said Y-containing formula represents repeating units of the structure

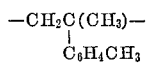

9. A brominated copolymer of claim 1 in which copolymer said Y-containing formula represents repeating units of the structure

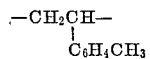

References Cited
UNITED STATES PATENTS

| | | | |
|---|---|---|---|
| 3,183,216 | 5/1965 | Cohen et al. | 260—89.5 |
| 3,254,115 | 5/1966 | Cohen et al. | 260—486 |
| 3,293,226 | 12/1966 | De Schrijver | 260—96Hal |
| 3,437,688 | 4/1969 | Schwartz | 260—486 |

OTHER REFERENCES

Roberts, Basic Principles of Organic Chemistry, published by W. A. Benjamin, Inc., New York, N.Y. (1964), pp. 216.

HARRY WONG, JR., Primary Examiner

U.S. Cl. X.R.

260—33.6, 33.8, 78.5, 80.75, 80.81, 86.1, 86.7, 885, 901

UNITED STATES PATENT OFFICE
CERTIFICATE OF CORRECTION

Patent No. 3,562,230      Dated February 9, 1971

Inventor(s) G. F. D'Alelio

It is certified that error appears in the above-identified patent and that said Letters Patent are hereby corrected as shown below:

In Column 2, Lines 48-50, correct the formula to read:

$$\begin{array}{l}-CH_2C(CH_3)-\\ \phantom{-CH_2}|\\ \phantom{-CH_2}COOCH(R')CBr_2CR''Br_2\end{array}$$

In Column 8, Lines 18-21, correct the formula to read:

$$\begin{array}{l}-CH_2C(CH_3)-\\ \phantom{-CH_2}|\\ \phantom{-CH_2}COOCH(R')C=CR''Br\\ \phantom{-CH_2COOCH(R')}|\\ \phantom{-CH_2COOCH(R')}Br\end{array}$$

Signed and sealed this 3rd day of August 1971.

(SEAL)
Attest:

EDWARD M. FLETCHER, JR.
Attesting Officer

WILLIAM E. SCHUYLER, JR.
Commissioner of Patents